Sept. 23, 1941. W. F. DAVIDSON ET AL 2,256,897
INSULATING JOINT FOR ELECTRIC CABLE SHEATHS AND METHOD OF MAKING SAME
Filed July 24, 1940 3 Sheets-Sheet 1
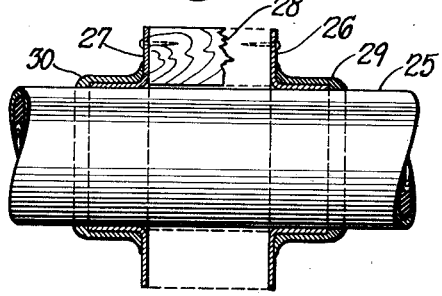
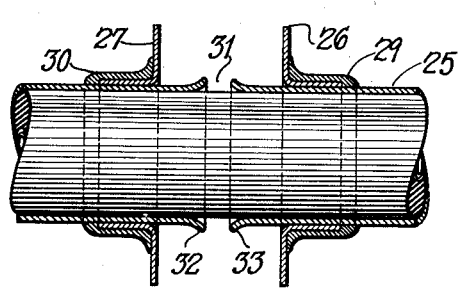
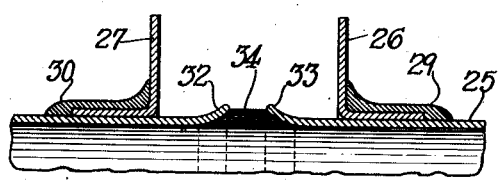
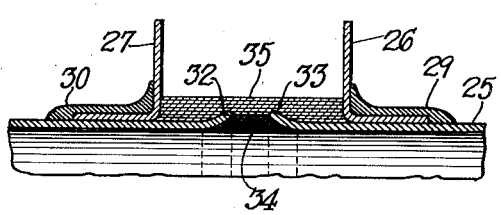
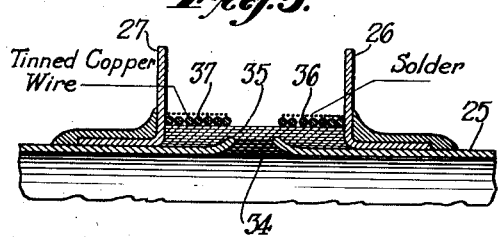
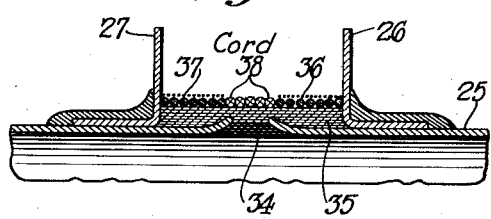
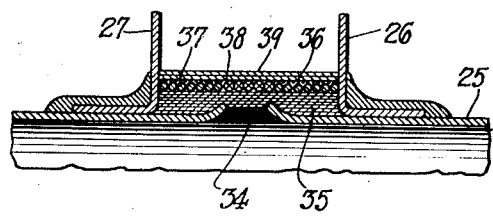
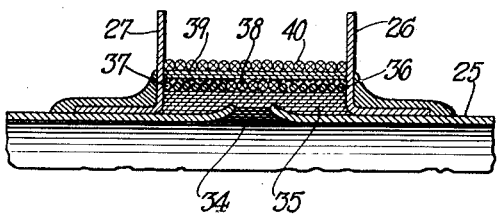
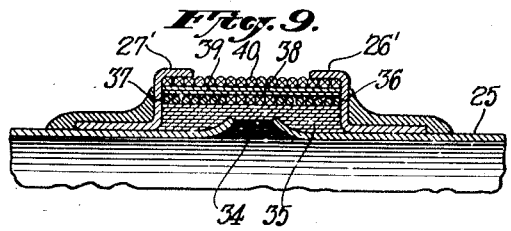
INVENTORS
WARD F. DAVIDSON.
EARL R. THOMAS.
BY Ward, Crosby + Neal
ATTORNEYS

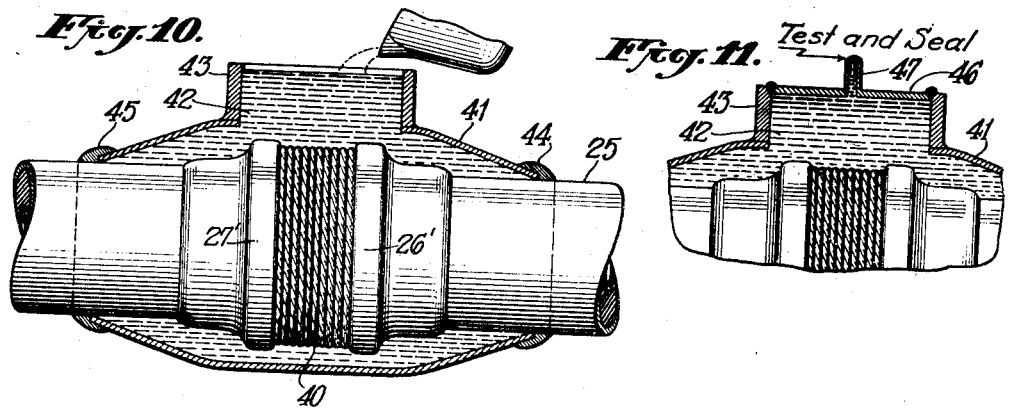
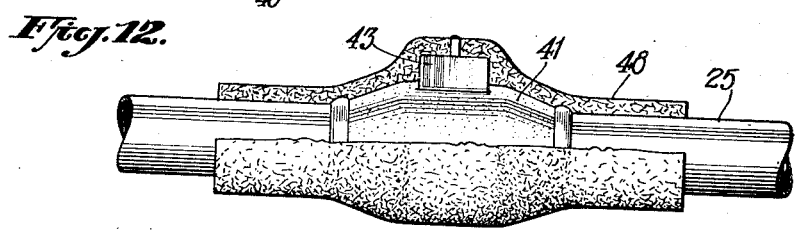
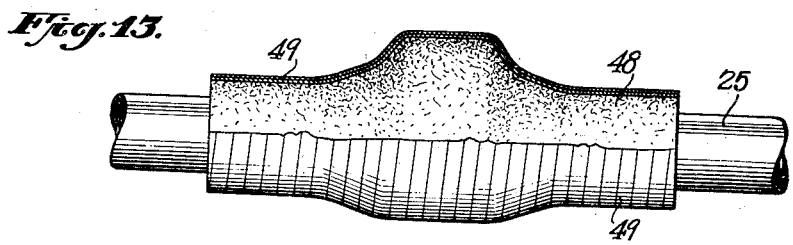
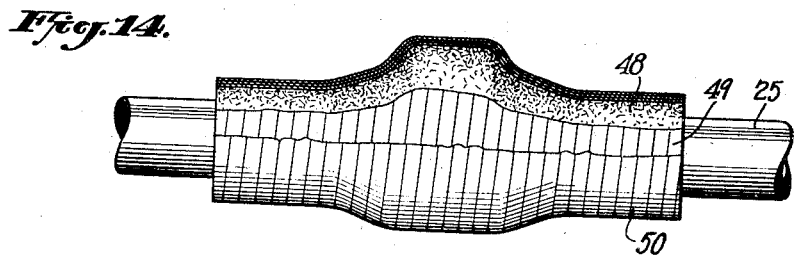
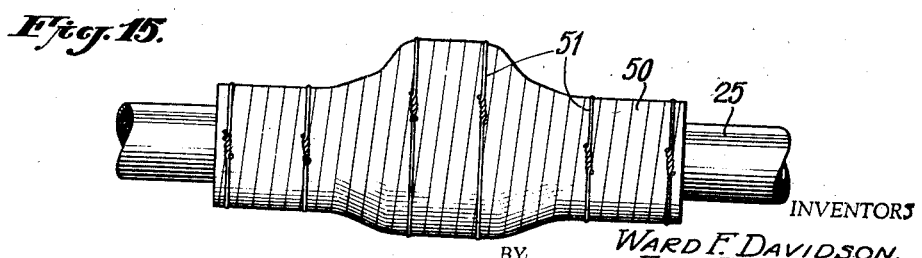

Sept. 23, 1941.  W. F. DAVIDSON ET AL  2,256,897
INSULATING JOINT FOR ELECTRIC CABLE SHEATHS AND METHOD OF MAKING SAME
Filed July 24, 1940  3 Sheets-Sheet 3
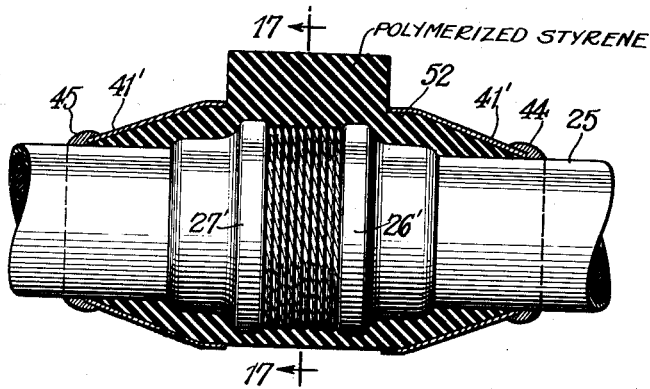
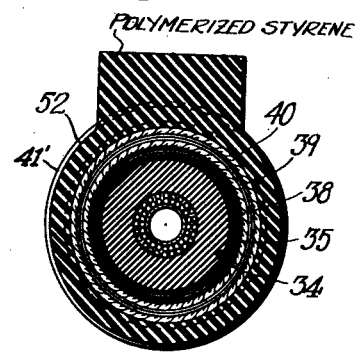
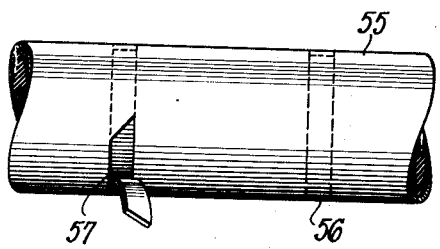
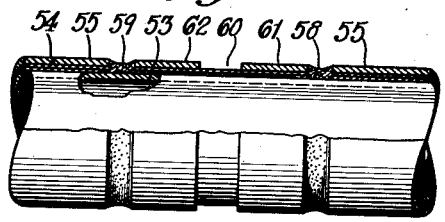
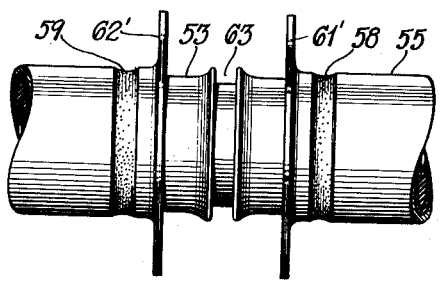
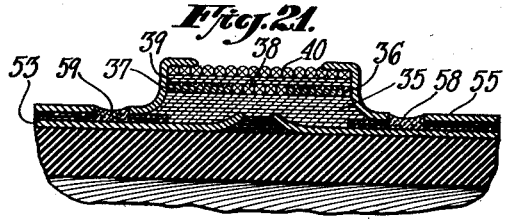
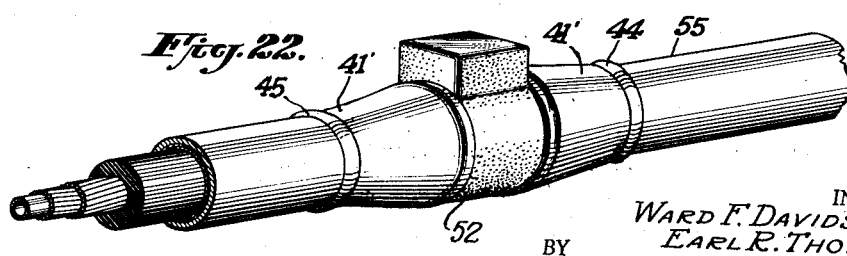
INVENTORS
WARD F. DAVIDSON.
EARL R. THOMAS.
Ward, Crosby & Neal
ATTORNEYS Patented Sept. 23, 1941

2,256,897

UNITED STATES PATENT OFFICE 2,256,897

INSULATING JOINT FOR ELECTRIC CABLE SHEATHS AND METHOD OF MAKING SAME

Ward F. Davidson, Port Washington, N. Y., and Earl R. Thomas, Palisades Park, N. J., assignors to Consolidated Edison Company of New York, Inc., New York, N. Y., a corporation of New York Application July 24, 1940, Serial No. 347,168

10 Claims. (Cl. 174—85)

This invention relates to insulated joints for electrical conductors and is particularly adapted for use in forming joints for isolating electrically, succeeding sections of cable sheaths, although various features of the invention are adaptable to other electrical insulating purposes.

In order to reduce power losses due to stray currents in metallic cable sheaths, heretofore it has been the practice to divide the sheaths into sections insulated from each other as by cutting out a narrow band of the sheath and thereafter protecting and insulating the cable at this area by means of cements and tapes. However such a method does not provide an insulating joint which will be durable and wholly dependable over any long period of time and is not adapted for use on cables operating under oil pressures greater than about 15 lbs. per square inch, for example. There are also manufactured products consisting of mechanical assemblies incorporating gaskets, porcelain insulators, etc., intended to accomplish similar results, but these are not adaptable for sectionalizing the sheaths of cables which have already been installed and are in use. There are at present many electrical power cables in use, the current-carrying capacity of which could be greatly increased if the metallic cable sheath could be suitably sectionalized with insulated joints while leaving the cable in use.

According to the present invention, an exceedingly durable and relatively inexpensive, insulated joint of great mechanical strength may be provided for sectionalizing cable sheaths without breaking the continuity of the cable conductor and without otherwise disturbing the use of the cable; the improved joint also being adapted for cables operated under the highest oil pressures ordinarily met with in electric power cables.

According to one phase of the invention, the insulating material used for forming or enclosing the joint comprises styrene or an equivalent material, polymerized as a hard, tough, sleeve-like member formed in situ and embracing and bonded to the adjacent ends of the cable sheath sections. The use of styrene for this purpose involves a number of difficult problems which the present invention overcomes in various ways hereinafter described.

Various further and more specific objects, features and advantages of the invention will more clearly appear from the detailed description given below taken in connection with the accompanying drawings which form a part of this specification and illustrate merely by way of example certain preferred forms of the invention. The invention consists in such novel features, arrangements, methods and combinations as may be hereinafter disclosed and claimed.

In the drawings, Figs. 1–15 inclusive are side views partially broken away showing various successive steps for forming an insulated joint between adjacent sections of the sheath of a so-called single sheath electric power cable;

Figs. 16 and 17 are respectively longitudinal and transverse sectional views of the finished joints;

Figs. 18–21 inclusive illustrate various steps in forming the joint on a double sheath cable; and Fig. 22 is a perspective view of the finished joint made according to the steps illustrated in Figs. 18–21.

Referring to Fig. 1, the lead sheath of a cable is shown at 25. At the area where the sectionalizing joint is desired, the sheath is first scraped clean and the central portion of this area may be polished with abrasive paper. Then two pairs of split lead flanges as at 26, 27 are applied so as to embrace the sheath at spaced positions, and these flanges may be temporarily retained in such positions as by tacking same to a split wood spacer or spacer members as indicated at 28. Thereupon "wiped" solder joints as at 29, 30 may be formed between the cable sheath and the lead flanges in the manner shown in Fig. 1, whereby the flanges are permanently secured and sealed in respect to the sheath. Thereupon the wooden spacer blocks may be removed.

As indicated in Fig. 2, the next step may comprise removal of a narrow band of the lead sheath, which may be cut away as at 31, after which the remaining edges at the ends of the sheath sections may be belled outwardly slightly as shown at 32, 33.

As shown in Fig. 3, the next step may comprise filling the space between the sheath ends 32, 33 with a suitable insulating tape as at 34, which may comprise for example, in the neighborhood of a dozen layers of ¾ inch silk tape.

After making certain that the surfaces of the cable sheaths between the flanges 26 and 27 are polished and free of oil, the next step may comprise covering these portions and the area therebetween with a suitable adhesive insulating tape, as shown at 35. For this purpose, one may use for example numerous layers of so-called ¾ inch Glyptal tape secured with a cement known commercially as "GE 1276" or "GE 1201" or an equivalent, between each layer.

As shown in Fig. 5, areas 36, 37 at each end of the taped area 35 may next be closely wound with wire, for example No. 14 copper wire, which should be tinned, inasmuch as tin will not interact with the styrene mixture hereinafter described, in case such mixture should come in contact with the wire. These strands of wire may be secured in position as by "spot" soldering. As shown in Fig. 6, the space which has to be insulated, between the wired areas 36, 37 may next be covered with a winding of cord 38, for example a good grade of chalk line cord.

Thereafter as shown at Fig. 7, two or more layers of the Glyptal tape as at 39 secured with cement such as above mentioned, may be applied to cover the wire and cord windings. This tape should preferably be so wound that each turn overlaps one-half of the adjacent turn. Next, as shown in Fig. 8, the taped area 39 may be wholly covered with a winding of chalk line cord as at 40, whereupon the peripheral portions of the flanges 26, 27 may be "dressed" down as at 26', 27' into contact with the cord winding 40.

The steps thus far described serve to provide an effective annular insulated joint embracing and surrounding the spaced ends of the severed sleeve, such joint being sufficiently tight to prevent any leakage of oil from within the cable even though the interior of the cable may be subjected to oil pressures up to 40 lbs. per square inch, for example, at least until the hard polystyrene plastic enclosure for the joint is formed as hereinafter described. It has been found possible to perform the sealing steps as above described while the cable remains installed in use and without the loss of any substantial amount of the oil by seepage through the outer insulation coverings of the cable which are left uninterrupted just beneath the lead sheath. The seal as thus formed with the materials above specified also does not deteriorate in the presence of oils of types customarily used for filling cables. Furthermore, the materials used in the seal are such that they may be subjected to the styrene mixture hereinafter specified without deterioration and without interfering with the desired properties of polystyrene or its polymerizing action.

The area of the joint may now be enclosed in a split lead sleeve as at 41, the central portions of which should be spaced substantially from the flange portions 26', 27', and the end portions of which are preferably gradually tapered down as shown, to the diameter of the cable sheath 25. The sleeve 41 may be formed at its upper side with an opening 42 surrounded by a box-like structure 43 initially open at its top. The ends of the sleeve 41 may be permanently secured and sealed to the cable sheath as by solder "wipes" 44, 45. All of the seams of the enclosure 41, 43 may be sealed by burning with lead or by soldering, and the various parts of this enclosing structure or mold are preferably formed of lead or tin, or the interior surfaces are coated with lead or tin, since these metals, as distinguished from copper for example, will not interact with, or be affected by the styrene mixture hereinafter described.

When the mold is completed as shown in Fig. 10, and after making certain that all interior metal surfaces within the mold are bright and free from oil and foreign matter, the mold may be filled with the styrene mixture, by pouring same into the open top of the box-like or reservoir portion 43 as shown.

The tapered form of the mold 41 is such as to avoid the formation of enclosed air spaces in the regions at the ends of the sleeve 41 and thus the formation of voids in the completed polymerized mass is avoided. The box-like portion or reservoir 43 serves to provide an excess of the styrene mixture to compensate for shrinkage during the subsequent polymerizing action. After the enclosure is filled, a removable lead cover for the portion 43 may be provided as at 46 and soldered in place around its periphery. This cover may be formed with a lead pipe test vent as at 47 normally kept sealed at its upper end as by solder, thus excluding moisture and preventing evaporation. Within the top of the mold the pressure remains substantially at atmospheric level, although higher or lower pressures do not appear either beneficial or detrimental.

The styrene mixture above referred to may preferably comprise prepolymerized styrene formed by heating styrene at its boiling point (145° C.) for a period sufficient to cause its specific gravity to rise from 0.906 preferably to about 0.965, or from about 0.960 to 0.980 (at 22° C.). This period of boiling may require for example from one-half hour to one hour, as may be determined by trial tests of the specific gravity. Such prepolymerized styrene (after cooling) is preferably thoroughly mixed with a small amount of a suitable polymerization accelerator comprising for example 0.5% (or from about 0.1 to 0.5%) benzoyl peroxide and an appropriate small amount of a suitable plasticizer comprising for example 0.5% (or from about 0.5% to 2%) of dibutylphthalate. The accelerator as added should preferably be in the form of a dry powder, since its addition in the form of a solution is undesirable in view of the fact that the material is finally to be cured in a sealed mold from which any solvent could not escape but would interfere with the hardening of the plastic. The use of the plasticizer as a solvent for the accelerator was found to be undesirable because the benzoyl peroxide would be only partially soluble in the amount of dibutylphthalate above specified.

The above described prepolymerized styrene mixture with the accelerator and plasticizer should preferably be maintained at a temperature of no more than 2° C. during its storage and transportation and it is recommended that the mixture shall not be stored for more than 7 days prior to its use, or stored at temperatures less than 2° during this period. Such mixture should preferably be kept in a tin coated container or other suitable receptacle which will not interact with or otherwise alter the properties of the material. Filling of the molds should preferably not be done in the presence of high humidity or low temperatures. The molds, such as shown in Figs. 10, 11, should be capable of excluding moisture during the curing action.

Mixtures such as above referred to and various possible alternative mixtures and methods of preparing and using same in the molding operation are more fully described and certain features relative thereto are claimed in the copending application of Erich O. Meyer, Ser. No. 347,173, filed on even date herewith, and entitled "Polystyrene products and methods of making and using same."

The above described preferred mixture is syrup-like and thus easily poured and is particularly adapted to polymerize into a hard, tough polystyrene plastic by keeping the same continuously warm over a period of many days at a relatively low temperature such as may be readily secured from the heat of the cable while in use, for instance temperatures in the neighborhood of from 30 to 40° C., maintained over a period of from 10 to 40 days for example. During this time the liquid composition first gradually thickens and becomes a soft gel, say in four or five days. Then during the next two or three days it forms a hard gel. After about ten days of curing under these conditions, a tough plastic is formed and by about 25 days, Rockwell hardness tests indicate a very hard plastic, and the hardness is further increased during the next 10 or 15 days of the treatment. However, with the mixture above specified, under some conditions, the temperature may vary from say 15° C. (in case the current is shut off) up to as much as 70° (as when the cable is operating at a high load), while still obtaining a tough, hard plastic tenaciously adhering to the lead sheaths. With the higher temperatures, the product hardens in correspondingly shorter times, but if the higher temperatures are maintained too long during polymerization, the product tends to be somewhat brittle or less tough. For example, with this prepolymerized mixture kept at about 22° C., a hard plastic is formed in about 30 days, whereas at temperatures of 40° C. a hard plastic is formed in about 10 days. Of course, in many cases injury would occur to the cable insulation if substantially higher temperatures were attempted at a cable sheath joint.

While the curing period may be shortened by using larger amounts of the accelerator than above specified, the product tends to be excessively brittle, and may have air bubbles, as with the use of higher temperatures.

Referring now again to Figs. 10–12, in order to efficiently and effectively make use of the heat of the cable in use, to secure a suitable polymerizing temperature which will be substantially constant over a period of days and uniform at various parts of the joint, the mold parts 41 and 43 are preferably wrapped with heat insulation material. This may comprise for example a layer of wool 1 inch thick as at 48 (Fig. 12), two layers of asbestos listing as at 49 (Fig. 13), and one layer of paraffin cotton tape as at 50 (Fig. 14), all secured in place as by spaced wire bands 51 (Fig. 15). Other suitable methods of insulation may also be used, such as for example a winding of string covered with a layer of aluminum foil followed by layers of cheese cloth, asbestos tape and paraffin cotton tape. The proper amount and character of the insulation may be readily determined by trial and depends upon the polymerizing temperature range desired, the resistance of the cable and the amount of current normally carried thereby in use.

With the joint as shown wrapped in Figs. 12–15, on a cable in use with a normal load, and with the preferred prepolymerized styrene mixture above specified, a temperature of about 35–38° C. may be readily maintained in the mixture and the mixture will become both hard and tough within about 14 days. In about 40 days or thereabouts for example, the heat insulation material may be safely removed, and the resulting mass will have a mechanical strength as shown by transverse bending tests, equivalent to the maximum generally obtainable in plastic compositions. At the same time a substantial part of the central portion of the sleeve 41, together with the reservoir 43, should be cut away so as to leave for example a finished insulation joint as shown in Figs. 16 and 17. As appears in Fig. 16, the end portions of the lead mold or sleeve 41 may be left as at 41', and these will form annular bands sealed at one edge by the solder "wipes" to the cable sheath, and covering and protecting the thin edges of the plastic.

The resulting hard plastic mass 52 will be substantially free of bubbles and so firmly bonded to the cable sheath and the flanges 26, 27 that any force tending to pull apart the cable sections will ordinarily tear the lead sheath about as soon as, or before the plastic joint gives way or parts from the cable sheath. Such firm bonding of the insulation to the cable sheath is not only important from the mechanical standpoint, but also insures that there will be no leakage of oil from the cable even after long periods of time and with high oil pressures. The firm bond to the lead cable sheath is apparently not only due to the inherent tenacity of the plastic as polymerized in situ on metals such as lead or tin, but also enhanced considerably by the gradual shrinkage of the mass into close embrace of the cable during the slow hardening.

The resulting plastic mass is substantially transparent and thus the condition of the preliminary oil seal at 40 may be easily inspected at any time if desired and any imperfections in the joint or its bond to the cable sheaths will be apparent.

When the mold is first removed, the surface of the plastic, except for the top area, may be slightly translucent or milky due possibly to a very slight effect of the lead on the styrene while still only partially polymerized, but the clear transparent mass may be easily revealed by rubbing the surface with a small amount of a suitable polystyrene solvent.

The plastic is not affected by oxygen, weak acids and alkalis, nor by water, or oils such as used in the cable. Sudden wide changes of temperature as from —70° C. up to +60° C. have no apparent effect on the polystyrene mass, and the same may be subjected to temperatures up to about 100° C. at least, without recognizable softening. The resistance of typical joints made according to the above described methods is very high, for example from 600 to 800 megohms. The plastic has particularly desirable insulating properties for the purpose, including a low dielectric power factor.

Some cables are provided with a double sheath, as for example an inner lead sheath as at 53 (Fig. 19), separated by copper reinforcing tape as at 54 from an outer lead sheath as at 55. With such cables after first scraping the area of the desired joint, the first step as shown in Fig. 18 may comprise removal of a band of the outer sheath at each of two places as at 56, 57. The resulting exposed areas may then be solder "wiped" as at 58, 59 (Fig. 19). Thereupon a central band of the outer sheath may be cut away as at 60. Then portions of the outer sheath as at 61, 62 may be belled outwardly to form flanges 61', 62' (Fig. 20) for serving purposes generally equivalent to the lead flange members 26, 27 hereinabove referred to. Next, the copper reinforcing tape at the areas between the flanges 61', 62' may be removed and a band of the inner lead sheath may be cut away as at 63 to form a gap equivalent to that at 31 in the embodiment previously described. The edges at this gap may be belled outwardly somewhat in the same manner as in the case of Fig. 2. Thereafter the same steps as with the previously described embodiment may be taken to form a seal as shown in Fig. 21, generally similar to that of Fig. 9. Thereafter the polystyrene plastic enclosure may be formed around the joint in substantially the same manner as above described, to provide a completed joint as shown in Fig. 22.

The above described method of using the heat of the cable in use, for curing the prepolymerized styrene mixture to form a plastic, has a number of unique advantages overcoming difficulties which would otherwise be encountered in using this class of insulating material for the purpose. For example, since it is advisable to cure the mixture in a sealed receptacle to exclude moisture and prevent evaporation during the polymerizing action, it would be a difficult problem to uniformly and constantly heat all portions of the joint by externally applied heating means, especially since the joints are often located in places inconvenient of access, underground and elsewhere. And of course if external heating means for the sealed molds were used, for a large cable system, large numbers of the heating devices would have to be purchased inasmuch as each device would have to remain installed on each joint for many days before it could be taken away for reuse. Furthermore, all these heating units in use would have to be inspected frequently to insure their proper operation, lest short circuits and overheating would injure or destroy the cable, or insufficient or irregular heating result in an unsatisfactory joint. On the other hand, if it were attempted to expedite the curing action by using higher temperatures or a greater percentage of the accelerator, then the resulting plastic mass will be too brittle to be of value for the desired purposes. Also with higher temperatures dissolution of the Glyptal tape and corrosion of the lead sheath would occur. For example, with a styrene mixture containing 3% benzoyl peroxide surrounded by an electrically heated air bath maintained at about 55° C. for 20 hours, examination of the resulting cast showed that it was largely solid, but brittle and capable of being shattered when subjected to hammer blows, yet certain spots subjected to the cooling effect of inlet and outlet tubes had still not become solidified. It is therefore apparent that a sufficiently reliable and uniform constant source of external heat would be difficult to maintain in the field even for a period such as 20 hours.

The use of heat insulation such as shown in Figs. 12–15 for example for completely surrounding the joint and mold, not only insures retention of sufficient heat from the heat of the current-carrying cable to give the desired polymerizing temperature, but also prevents the outer portions of the plastic from being subjected to temperature changes due to changing weather conditions and insures that all portions of the plastic mass will be heated substantially uniformly and thus thoroughly and uniformly polymerized during the predetermined curing period.

It is preferable that the reservoir portion 43 of the mold be included within the heat insulation enclosure. Otherwise during the curing period the heavier polymers would settle on the bottom of the mold and the monostyrene would accumulate at the top in the reservoir and the presence of the liquid monostyrene in the cold reservoir would have a cooling and dissolving effect on the partially polymerized plastic mass at the top of the mold.

The use of styrene which has been prepolymerized before it is poured into the molds, has a number of advantages. It is an important factor in shortening the actual time required to obtain a completely polymerized cast on the cable sheath. That is, a substantial part of the polymerizing action may be quickly accomplished at the boiling temperature, before bringing the styrene into the presence of the cable. Furthermore, it appears that styrene or polystyrene-benzoyl peroxide mixtures have a critical temperature at which the polymerization action becomes so exothermic and vigorous that the solution boils and foams. This is caused by a pronounced development of gas in the liquid. The possibility of the occurrence of such foaming in the cable joints is eliminated by using the prepolymerized mixture above specified with the mold temperature maintained merely by the heat of the cable. It has also been observed that monostyrene has a detrimental effect on various organic materials such as used in making the oil seal at the joint. However, by using the prepolymerized styrene, materials may be more readily selected for the oil seal, as to which the polymer is substantially inactive. Also by prepolymerizing the styrene, especially when following this by a long period of slow curing at relatively low temperatures such as obtainable from the cable heat, a product substantially free from bubbles is assured. That is, gases evolved during the prepolymerization at boiling temperatures have an opportunity to escape before the liquid is poured in the molds and gases formed during the curing of the material in the molds, have opportunity to rise to the top of the mold while the slowly cured mass is still liquid.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. In combination with a metal sheathed electrical cable, insulating means for sealing and bonding with respect to each other, the spaced apart ends of two succeeding sections of the cable sheath, comprising a hard, tough homogeneous mass of substantially bubble-free polystyrene forming a sleeve-like member extending over and embracing said ends and tenaciously bonded thereto by polymerization thereon and by consequent shrinkage thereon.

2. In combination with a metal sheathed electrical cable containing oil under pressure, insulating means for sealing with respect to each other the spaced-apart ends of two succeeding sections of the cable sheath, comprising wrappings of insulating adhesive material closing the annular space between said ends for forming at least a temporarily effective oil seal therebetween, said wrappings being formed of material effectively resistant to the oil in the cable and to styrene which is at least partially polymerized, and a hard, tough mass of polystyrene forming a sleeve-like member embracing said wrappings and said ends, said member being tenaciously bonded to said ends by polymerization thereon.

3. In combination, a substantially oil-tight insulation joint on the insulation of an oil-filled cable, and a mass of hard, tough polymerized styrene exposed to visual inspection and enclosing said joint and sealing same against access of moisture thereto, said mass being bonded to the cable by polymerization thereon and being free of voids and sufficiently transparent that the condition of said joint may be inspected therethrough.

4. In combination with an oil-filled metal sheathed cable, an insulating joint for sectionalizing the sheath comprising, adhesive windings of insulating material effective for at least several days to seal the space between sections of the metal sheath against seepage of oil therethrough, said windings being formed of material non-absorptive of oil and effectively resistant to the action of partially polymerized liquid styrene, annular retaining means embracing said windings, including flanged metallic members embracing the cable respectively at each side of said space and soldered to the cable sheath sections, whereby the flanges of said members cover and retain the annular edges of said windings, and a hard, tough, homogeneous mass of polystyrene forming a thick sleeve-like member enclosing said windings and flanged members, and also directly embracing and tenaciously bonded to portions of the sheath sections by polymerization thereon.

5. The method of insulating and sealing a joint area on an insulated electrical conductor which comprises enclosing the area in a mold, filling the mold with a partially prepolymerized liquid styrene composition including a small amount of polymerization accelerator, and then subjecting the composition to temperatures between about 15° C. and 50° C. to cause slow gradual polymerization, a sufficient amount of said accelerator being used at the temperatures of the treatment, to cause the composition to gradually thicken and become a soft gel over a predetermined time sufficient to permit the air bubbles formed therein to rise to the top of the mass and causing the composition during a further period of at least several days to form into a hard gel and finally a solid tough shrunken mass tenaciously bonded to the joint area.

6. The method of sealing and insulating from each other, the spaced-apart ends of two succeeding sections of lead sheath on an electric power cable, which comprises enclosing said ends in a mold, the ends of which mold respectively embrace the sheath sections, and the mid portion of which mold is spaced substantially from the sheathed cable, sealing the mold ends in respect to the sheath sections by solder or the like, filling the mold with a partially prepolymerized liquid styrene composition, which is slowly polymerized by prolonged heating due to the current in the cable in service at normal working temperatures, into a hard homogeneous tough mass free of voids, sealing the mold and allowing same to remain before removal, while the cable is in service, until such hard tough mass is so formed, and then removing at least an annular portion of the mold.

7. The method of insulating and sealing a joint area on an insulated electrical power conductor, which comprises enclosing the area in a removable mold, filling the mold with a partially polymerized liquid styrene composition which is slowly polymerized by prolonged heating due to the current in the cable in service at normal working temperatures, into a hard homogeneous tough mass free of voids, sealing the mold and allowing same to remain before removal, while the conductor is in service, until such hard tough mass is so formed.

8. The method of insulating and sealing a joint area on an insulated electrical power conductor, which comprises enclosing the area in a heat insulated mold, filling the mold with a partially polymerized liquid styrene composition which is slowly polymerized by prolonged heating due to the current in the cable in service at normal working temperatures, into a hard homogeneous tough mass free of voids, sealing the mold and allowing same to remain, while the conductor is in service, at least until such hard tough mass is so formed.

9. The method of insulating and sealing a joint area on an insulated electrical conductor which comprises enclosing the area in a mold, providing close to the upper part of the mold a hollow space communicating with the space in the mold, filling the mold and said space with a partially polymerized styrene liquid composition gradually polymerizable by low temperature heating and with shrinkage into a hard tough plastic, the liquid in said space being sufficient to compensate for the shrinkage of the mass in the mold and said space being sufficient to accumulate the evolved gases without formation of voids in the mass during hardening, sealing the mold, and treating the composition in the mold to polymerize same into a hard plastic by utilizing the heat normally produced by current flowing in the conductor.

10. The method of dividing into insulated sections, the metal sheath of an oil filled electric power cable in use, and of providing a substantially permanent insulating seal for the ends of the resulting sections which comprises cutting away an annular band of the sheath, then applying windings of insulating and adhesive material forming a substantially oil-tight seal effective at least for many days, enclosing the windings in a mold, filling the mold with a partially polymerized styrene liquid composition gradually polymerizable at the normal working temperatures of the cable, into a hard, tough plastic free of voids, sealing the mold, utilizing the heat normally produced by current flowing in the cable within the mold to slowly polymerize the composition over a period of days, and after the plastic is formed, removing at least an annular portion of the mold.

WARD F. DAVIDSON.
EARL R. THOMAS.